US00RE38632E1

(19) United States
(12) Reissued Patent
Schmidt et al.

(10) Patent Number: US RE38,632 E
(45) Date of Reissued Patent: Oct. 19, 2004

(54) PROPULSION CONTROL APPARATUS AND METHOD FOR A PAVER

(75) Inventors: Keith R. Schmidt, Anoka, MN (US); Conrad G. Grembowicz, Peoria, IL (US); Alan L. Ferguson, Peoria, IL (US)

(73) Assignee: Caterpillar Paving Products Inc, Minneapolis, MN (US)

(21) Appl. No.: 09/627,652

(22) Filed: Jul. 28, 2000

Related U.S. Patent Documents

Reissue of:
(64) Patent No.: 5,787,374
Issued: Jul. 28, 1998
Appl. No.: 08/548,122
Filed: Oct. 25, 1995

(51) Int. Cl.[7] ..... B62D 11/22; F16H 37/14
(52) U.S. Cl. ..... 701/41; 701/42; 701/50; 180/6.32; 180/6.7
(58) Field of Search ..... 701/50, 41, 42; 180/6.32, 6.7, 168, 192, 242, 243

(56) References Cited

U.S. PATENT DOCUMENTS

| | | | | | |
|---|---|---|---|---|---|
| 3,477,225 | A | * | 11/1969 | Cryder et al. | 60/433 |
| 3,803,841 | A | * | 4/1974 | Erickson et al. | 60/421 |
| 3,908,374 | A | * | 9/1975 | Habiger | 60/420 |
| 4,080,850 | A | * | 3/1978 | Bubula et al. | 74/731.1 |
| 4,096,694 | A | * | 6/1978 | Habiger et al. | 60/459 |
| 4,161,865 | A | | 7/1979 | Day | 60/385 |
| 4,175,628 | A | * | 11/1979 | Cornell et al. | 180/6.48 |
| 4,185,521 | A | * | 1/1980 | Beals | 477/69 |
| 4,193,323 | A | * | 3/1980 | Bubula et al. | 475/83 |
| 4,203,293 | A | * | 5/1980 | Bubula et al. | 60/490 |
| 4,310,078 | A | * | 1/1982 | Shore | 477/1 |
| 4,315,555 | A | | 2/1982 | Schritt | 180/415 |
| 4,399,886 | A | * | 8/1983 | Pollman | 180/197 |
| 4,420,991 | A | * | 12/1983 | Meyerle | 475/23 |
| 4,527,649 | A | * | 7/1985 | Mauldin | 180/6.48 |

(List continued on next page.)

FOREIGN PATENT DOCUMENTS

EP 0885798 A1 5/1998

OTHER PUBLICATIONS

Section 260, Steering and Brakes Manual (month and year are not available).
Steering System of John Deere 800 Series Track Tractors, Dr. Sanjay I. Mistry & Yifei R. Hou, 1998 (month is not available).

*Primary Examiner*—Tan Nguyen

(57) ABSTRACT

An apparatus is disclosed for controlling the propulsion and steering of a machine. The machine includes a hydrostatic system that drives a pair of ground engaging traction devices. An electronic controller receives operator signals indicative of a desired travel speed and direction, and determines a desired rotational speed of the ground engaging traction devices. The electronic controller produces command signals indicative of the determined speeds to regulate the speed of the ground engaging traction devices to the desired speed.

32 Claims, 4 Drawing Sheets

U.S. PATENT DOCUMENTS 4,541,497 A * 9/1985 Riediger et al. ..... 180/6.48
4,702,358 A * 10/1987 Mueller et al. ..... 192/13 R
4,736,811 A * 4/1988 Marsden et al. ..... 180/406
4,754,824 A * 7/1988 Olsson ..... 180/6.48
4,914,592 A * 4/1990 Callahan et al. ..... 701/41
5,099,938 A 3/1992 Watanabe et al. ..... 180/415
5,101,919 A * 4/1992 Ossi ..... 180/6.2
5,162,707 A * 11/1992 Joseph ..... 318/60
5,208,751 A 5/1993 Berkefeld ..... 701/41
5,249,422 A * 10/1993 Smith et al. ..... 60/426
5,249,639 A 10/1993 Marr et al. ..... 180/406
5,445,234 A * 8/1995 Hall, III ..... 180/6.28
5,487,437 A * 1/1996 Avitan ..... 316/67
5,489,005 A 2/1996 Marcott et al. ..... 180/418
5,497,692 A 3/1996 Marcott ..... 91/523
5,520,262 A 5/1996 Marcott ..... 180/418
5,535,840 A * 7/1996 Ishino et al. ..... 180/6.44
5,553,517 A 9/1996 Yesel et al. ..... 29/898.09
5,569,109 A * 10/1996 Okada ..... 475/28
5,590,041 A * 12/1996 Cooper ..... 701/41
5,611,405 A * 3/1997 Ishino et al. ..... 180/6.44
5,787,374 A 7/1998 Ferguson et al. ..... 701/41
5,805,449 A 9/1998 Ito ..... 701/41

* cited by examiner

PROPULSION CONTROL APPARATUS AND METHOD FOR A PAVER

Matter enclosed in heavy brackets [ ] appears in the original patent but forms no part of this reissue specification; matter printed in italics indicates the additions made by reissue.

TECHNICAL FIELD

This invention relates generally to an apparatus for controlling the propulsion of a paver and, more particularly, to an apparatus for controlling the propulsion of a paver utilizing a microprocessor based system.

BACKGROUND ART

Asphalt pavers include a hopper for receiving paving material and a conveyor system for transferring the paving material from the hopper for discharging on the roadbed. Screw augers spread the material on the roadbed in front of a floating screed, which is connected to the paving machine by pivoting tow or draft arms. The screed functions to format and compact the paving material distributed by the augers, ideally leaving the finished road with a uniform, smooth surface.

Such machines may be propelled by using several types of ground engaging traction devices, e.g., rubber wheels or endless metal (or rubber) belts that are disposed on opposite sides of the machine. The steering of a belted type machine is carried out by creating a differential speed between the oppositely disposed ground engaging traction devices.

Unfortunately, such machines that use differential speed steering develop several problems. Once such problem is that the machine does not track straight when it is desired that it do so. Another problem is that the desired turn radius of the machine varies with the travel speed of the machine. Thus, it becomes difficult for the operator to control the machine with a high degree of consistency—a crucial element for asphalt paving.

Another problem of typical pavers is the reliance on analog circuitry to control the propulsion. As is well known, analog circuitry is inflexible and does not allow for customization of machine performance as does programmable digital circuitry.

Finally, another problem of many pavers is the use of the mechanical braking system to stop the machine. Such mechanical braking system are typically used in conjunction with the hydrostatic drive system. However, because rarely does the mechanical braking system act in concert with the hydraulic system, abrupt breaking or wearing of the mechanical brakes may occur.

The present invention is directed to overcoming one or more of the problems as set forth above.

DISCLOSURE OF THE INVENTION

In one aspect of the present invention, an apparatus for controlling the propulsion of a machine having a hydrostatic system that drives a plurality of ground engaging traction devices is disclosed. An electronic controller receives a desired travel speed signal and a steering angle signal, determines a desired rotational speed of the orthogonal engaging traction devices to steer the machine at the desired steering angle, and produces command signals indicative of the desired rotational speeds. An electrohydraulic device receives command signals and responsively controls the speed of the ground engaging traction devices to the desired speed to cause the machine to steer at a desired turning radius that is independent to the actual speed of machine travel.

BRIEF DESCRIPTION OF THE DRAWINGS

For a better understanding of the present invention, reference may be made to the accompanying drawings in which.

BEST MODE FOR CARRYING OUT THE INVENTION

Figure 1:
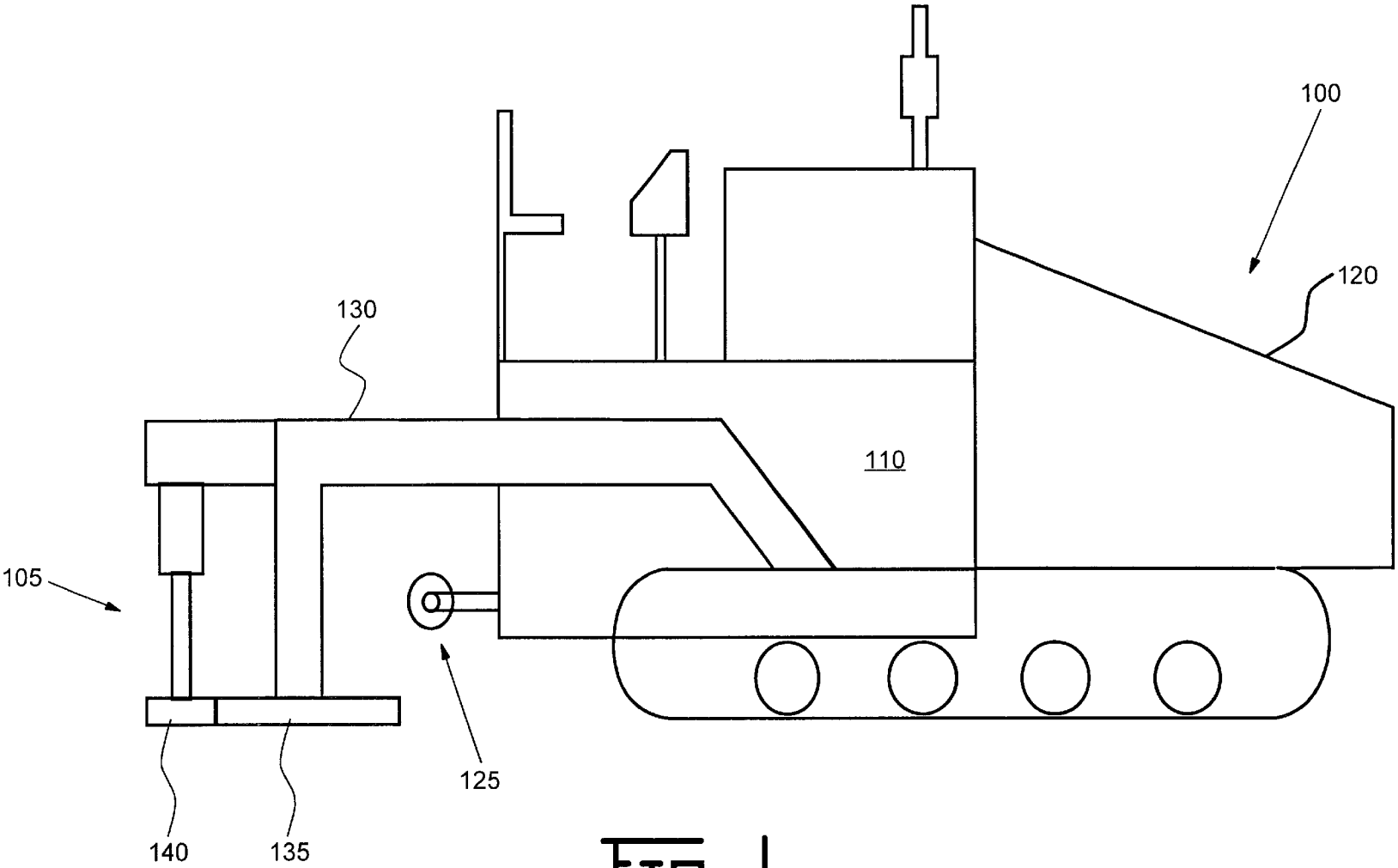
FIG. 1 illustrates a side view of an asphalt paver.

Referring now to the drawings, FIG. 1 illustrates a paver 100. The paver 100, as shown, is of the crawler track type having endless metal belts. However, those well skilled in the art can appreciate that the present invention is applicable to a paver of the rubber tire type. The paver 100 has a chassis 110 through which dual feed conveyors carry paving material, such as asphalt material, from a feed hopper 120 located at the front of the layer 100. Spreader augers 125, also referred to as spreading screws, are disposed transversely to and at the rear of the chassis 110. The augers 125 distribute the asphalt material transversely to the direction of travel of the paver 100. The material is spread over the desired width of a strip of pavement. The thickness and width of the pavement is established by the material-compacting, screed assembly 105. As shown, the screed assembly 105 is attached to the chassis 110 by a pair of draft arms 130. Preferably, the screed assembly 105 includes a main screed 135 and an extendable or extension screed 140. The main screed 135 is formed in two sections, one on each side of the center line of the paver. The extension screed 140 is mounted to each of the main screed sections.

Figure 2:
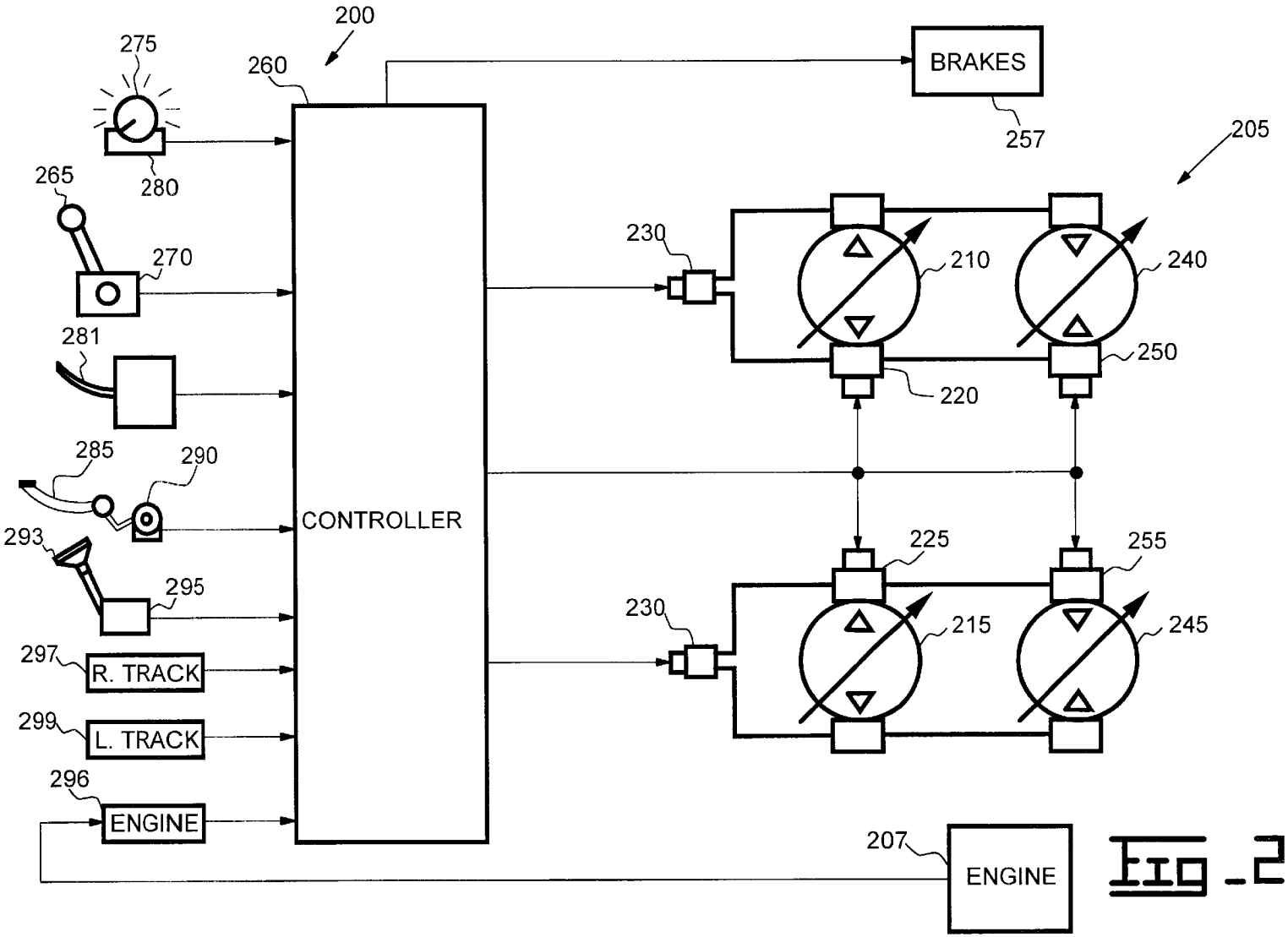
FIG. 2 illustrates an electronic control system for a hydrostatic drive system of the paver.

An electronic control system 200 for an hydrostatic drive system 205 of the paver 100 is shown in FIG. 2. The hydrostatic drive system 205 includes an internal combustion engine 207 that drives two variable displacement hydraulic pumps 210,215. The swashplate of each pump is actuable by a displacement actuator 220,225. Preferably, each displacement actuator includes a directional solenoid 230,225 that controls the output flow and direction of the respective pump, i.e., either forward or reverse. Each pump 210,215 provides high pressure fluid to a variable displacement motor 240,245, which includes a displacement solenoid 250,255 that is used to actuate the displacement of the respective motor. The motors 240,245 are used to provide the necessary torque in order to propel the machine via the right and left set of tracks. A plurality of spring applied, fluid released service brakes 257 are additionally provided.

The electronic control system 200 includes a microprocessor based controller 260 that includes system memory. The controller 260 receives various sensing signals and controls the displacement of the pumps 210,215 and motors 240,245, and the actuation of the brakes 257 in order to regulate the speed and steering of the machine.

A speed dial 275 is provided for the operator to set the maximum travel speed of the machine based on the engine speed. Accordingly, a speed dial sensor 280 produces a maximum travel speed signal that is proportional to the rotational position of the speed dial 275.

A propel lever 265 is provided for the operator to indicate a desired direction of machine travel, e.g, forward, reverse, or neutral. The propel level 265 additionally controls the acceleration or de-acceleration of the machine by indicating the desired percent of maximum travel speed. Accordingly, a proper level sensor 270 produces a propel signal that is indicative of the desired direction of machine travel and desired percent of maximum travel speed in response to the relative position of the position of the propel lever 265.

A speed range switch 281 is provided for the operator to select a desired speed range, e.g., travel, pave and maneuver. Because the preferred drive system is a hydrostatic drive system, the speed range is set by controlling the displacement of the hydraulic motors 240,245 (although a variable ratio reduction gearing could also be used). Accordingly, a speed range signal is produced in response to the position of the speed range switch 281.

A brake pedal 285 is provided for the operator to "quickly" decelerate or slow the machine.

The brake pedal 285 is intended to be operated by the feet to allow the operator's hands to be "free". Accordingly, a brake pedal position sensor 290 produces a braking signal having a magnitude that is proportional to the relative position of the brake pedal 285.

Finally, a steering wheel 293 is provided for the operator to steer the machine. Accordingly, a steering sensor 295 produces a steering angle signal that is representative of the desired steering angle of the machine. For example, the steering sensor 295 may sense the rotational position of the steering wheel 293 or, in the case of a rubber tired machine, the steering sensor 295 may be responsible to the steering angle of the steering wheels. Although a steering wheel is shown, it will become apparent to those skilled in the art that a set of levers, pedals, a joystick assembly, or the like may equally be used.

An engine speed sensor 296 produces an engine speed signal in response to the rotational speed of the engine 207. A right track sensor 297 produces a right track signal in response to the rotation of the right track. A left track sensor 299 produces a left track signal in response to the rotation of the left track. Preferably, the track sensors 297,299 are mounted integral to the respective motors 240,245 to monitor the rotation of the respective track drive gear. Thus, the track sensors produce a pulse for each occurrence of a passing tooth of the respective track drive gear.

The controller 260 utilizes arithmetic units to control various processes according to software programs. Typically, the programs are stored in read-only memory, random-access memory or the like. One such process is a braking control method that is discussed below.

The service brakes 257 and the hydrostatic drive system 205 are used as the primary braking system for the machine. For example, the controller 260 reduces the displacement of the pumps 210 in production to the amount of brake pedal depression to slow the machine. Once the machine stops, the controller 260 applies the service brakes 257 to hold the machine stationary. However, the service brakes 257 will be applied when the machine speed is zero or a predetermined time period after the brake pedal is fully depressed, the proper lever 265 is in neutral, or the speed dial 275 is at zero speed.

Figure 3:
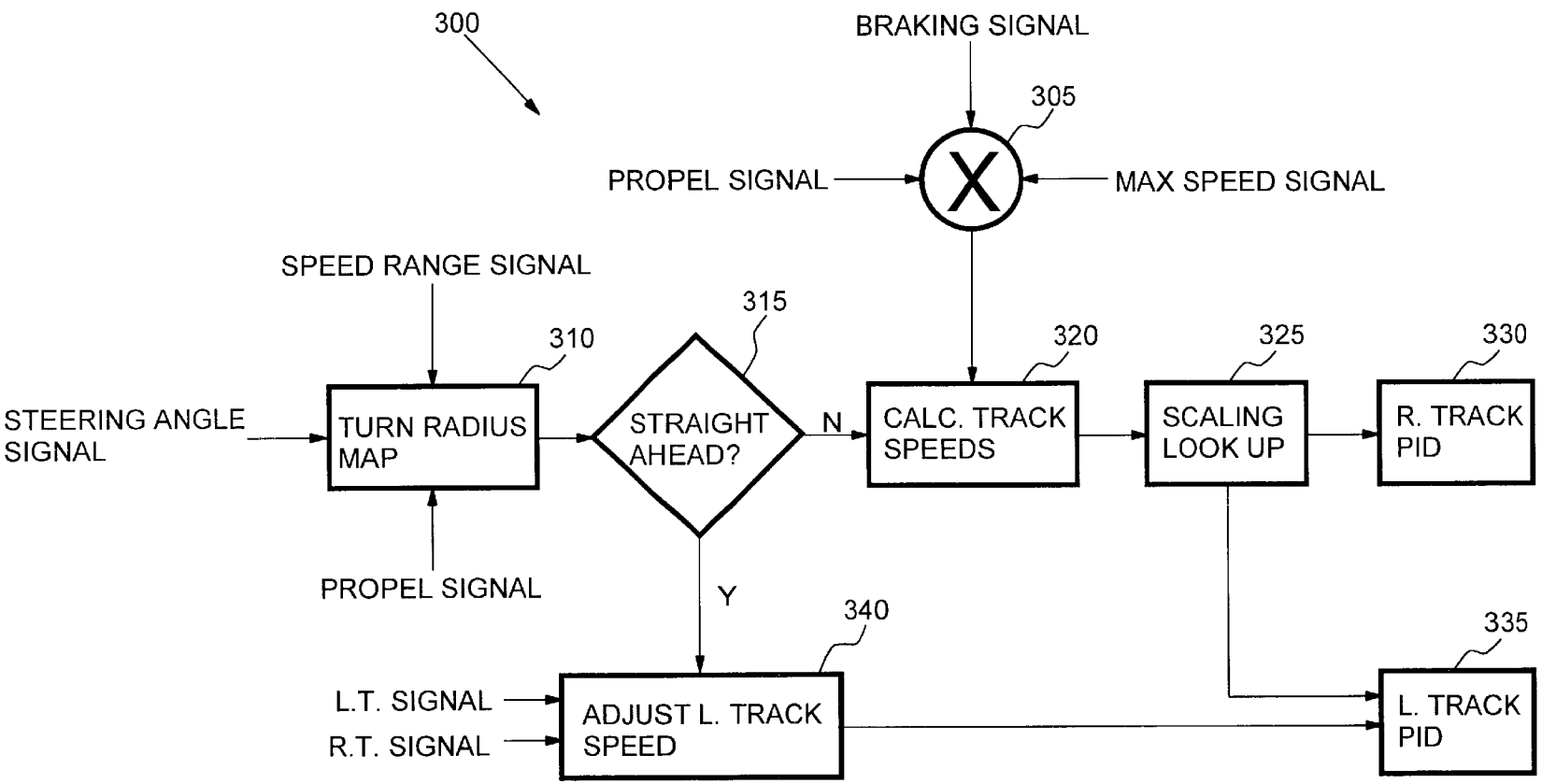
FIG. 3 illustrates a high level block diagram of steering and propelling control method.

Another such process is shown with reference to FIG. 3, which shows a high level block diagram of a steering and propelling control method 300. Advantageously, the steering control method 300 provides for the machine to track "straight" and also provides for the machine to turn with a constant radius that is independent to travel speed or engine speed.

A multiplication block 305 receives the propel, braking, and maximum speed signals and produces a desired travel speed signal in response to the product of the received signals.

A software look-up table routine 310 receives the steering angle, speed range, and directional signals, and selects a turning radius value that is indicative of a desired turning radius.

For example, the software look-up table routine may include a separate "map" for the forward and reverse travel directions. Moreover, each map may include several curves that are programmable to provide for different steering or handling characteristics. For example, each curve represents a desired turning radius as a function of the desired steering angle for a predetermined speed range. Note, the software look-up table may be equally substituted with a set of empirical equations used to calculate the turning radius value as a function of the desired steering radius, travel direction and speed range.

A decision block 315 determines whether the turning radius value represents a "straight ahead" or "turning" movement of the machine. If a turning movement is desired a track speed calculation routine 320 receives the desired travel speed signal and the turning radius value, and determines the right and left (or inner and outer) track speeds. For example, the outer and inner track speeds are calculated as follows:

Turn Radius Equations $$V_{outer}=V_{desired}(2-2R/G+2R)$$

$$V_{inner}=V_{outer}\ (R/R+G)$$

where:

$V_{desired}$=the desired machine travel speed;

R=the turning radius value; and

G=The gage of the machine, i.e., the width between the track centers.

The turns radius calculations shown above are valid for all turns. However, it is preferable to compare the calculated track speed values with low and high speed limits to compensate for hydraulic component deficiencies.

In general, speed control of hydraulic motors at very low speeds is poor. During very slow speed maneuvering, the calculated track speeds (for a given radius) can yield speeds that are two slow for the motors to achieve; thereby, adversely effecting machine steering. To prevent this type of condition, the inner track speed is limited to a minimum limit. Consequently, if the calculated inner track speed is too low of a value, the inner track speed is set to a minimum value and the outer track speed is recalculated. This prevents the machine steering characteristics from deteriorating at low travel speeds.

Slow Speed Calculations $$\text{if } V_{inner}<V_{min}, \text{ then } V_{inner}=V_{min}, \text{ and } V_{outer}=V_{min}\ (G+R)/R$$

Similarly, during high speed operations, the calculated track speeds (for a given radius) may be too high for the motors to achieve; thereby, adversely effecting machine steering. To prevent this type of condition, the outer track speed is limited to a maximum limit. Consequently, if the calculated outer track speed is too high, the outer track speed is limited to the maximum value and the inner track speed is re-calculated. This prevents machine steering characteristics from deteriorating at high travel speeds.

High Speed Calculation $$\text{if } V_{outer}>V_{max}, \text{ then } V_{outer}=V_{max}, \text{ and } V_{inner}=V_{max}(R/(R+G))$$

Further, it is desirable for the maximum travel speed of the machine to be as high as possible to minimize travel time. Track speed, however, must be limited to maintain desired steering characteristics and correct for track to track component tolerances and environmental conditions, e.g., machine load, temperature, terrain, etc. Advantageously, the present invention utilizes an adaptive or adjustable maximum track speed limit, which is automatically adjusted during machine operation. This provides for a particular machine to operate at a maximum travel speed that is responsive to the machine operating conditions, rather than provide preset limits based on "worst case" production tolerances.

During high travel speeds, the track speeds are monitored and compared to desired track speeds. If the actual track speed is less than the desired speed, the control determines if the track speed is at the maximum track speed limit. The control then adjusts the maximum track speed limit accordingly. Moreover, the control compares the pump command signal magnitudes produced by the PID controllers to a PID limit value to determine if the track speeds can be increased under present machine conditions. If so, the maximum track speed limits for both tracks are increased. However, if not, the maximum track speed limits are decreased.

Adaptive Speed Calculations $$\text{if } V_{actual}<V_{desired}, \text{ and } V_{actual}<V_{max}, \text{ then } V_{max}=V_{max}+V_{increase}$$

otherwise $$\text{if } V_{actual}<V_{desired}, V_{actual}<V_{max}, \text{ and } PID_{actual}\geq PID_{limits} \text{ then } V_{max}=V_{max}-V_{increase} \text{ else } PID_{actual}<PID_{limit} \text{ then } V_{max}=V_{max}$$

In the summary, the track speed calculation routine 320 calculates a desired speed for each track, which maintains a constant turning radius (at a desired steering angle)—irregardless of the machine travel speed.

A software look-up routine 325 receives signals representative of the calculated outer and inner track speeds and retrieves a pump command signal magnitude for each pump. Accordingly, feedback controllers 330,335 receives the pump command signals and deliver the signals to the respective pump solenoids in order to control the flow of fluid to the respective motors. For example, each feedback controller receives signals representative of the desired and actual track speeds, compares the track speeds to each other, and adjusts the respective pump command signal magnitude in order to control the actual track speed to the desired track speed. The feedback controllers 330,335 may use well known proportional plus integral control strategies to produce the respective pump command signals having sufficient magnitudes to accurately regulate the track speeds.

Adverting, back to decision block 315, if a straight-ahead movement is desired, then an adjustment routine 340 is called. The adjustment routine 340 receives the track signals associated with the left and right tracks, compares the number of pulses associated with each signal to one another, and adjusts the pump command signal of the left pump to equalize the track rotations. For example, if the left track is found to have traveled a greater distance than the right track, then the left pump command signal magnitude is decreased. Alternately, if the right track is found to have traveled a greater distance than the left track, then the left pump command signal magnitude is increased. Consequently, the adjustment routine 340 provides for the machine to track straight by equalizing the track rotation of the left and right tracks. Note, it is unimportant which track rotation is corrected, as the right pump command can equally be modified.

Preferably, the adjustment routine bases the adjustments over the entire distance that the machine is tracking straight, rather than making the adjustments over a predetermined time period. This means that the error between the track rotations are continually updated to provide for accurate adjustments.

The above routine is equally applicable to rubber tired machines. For example, to assist the steering of a rubber tired machine, the powered wheels may be controlled with a differential speed to enhance the steering characteristics.

Additionally, the above described control accounts for engine underspeed conditions while the machine is turning. For example, the maximum speed signal is produced in response to a map function where the magnitude of the maximum speed signal is determined in response to the engine speed. Preferably, the maximum speed signal is variable up to a maximum value that corresponds to a minimum engine speed. Thus, during a turning condition (which loads the engine causing the engine speed to droop), the map function causes the desired machine travel speed to be at a value low enough so as to not "kill" the engine, and yet maintain the desired turning radius.

Figure 4:
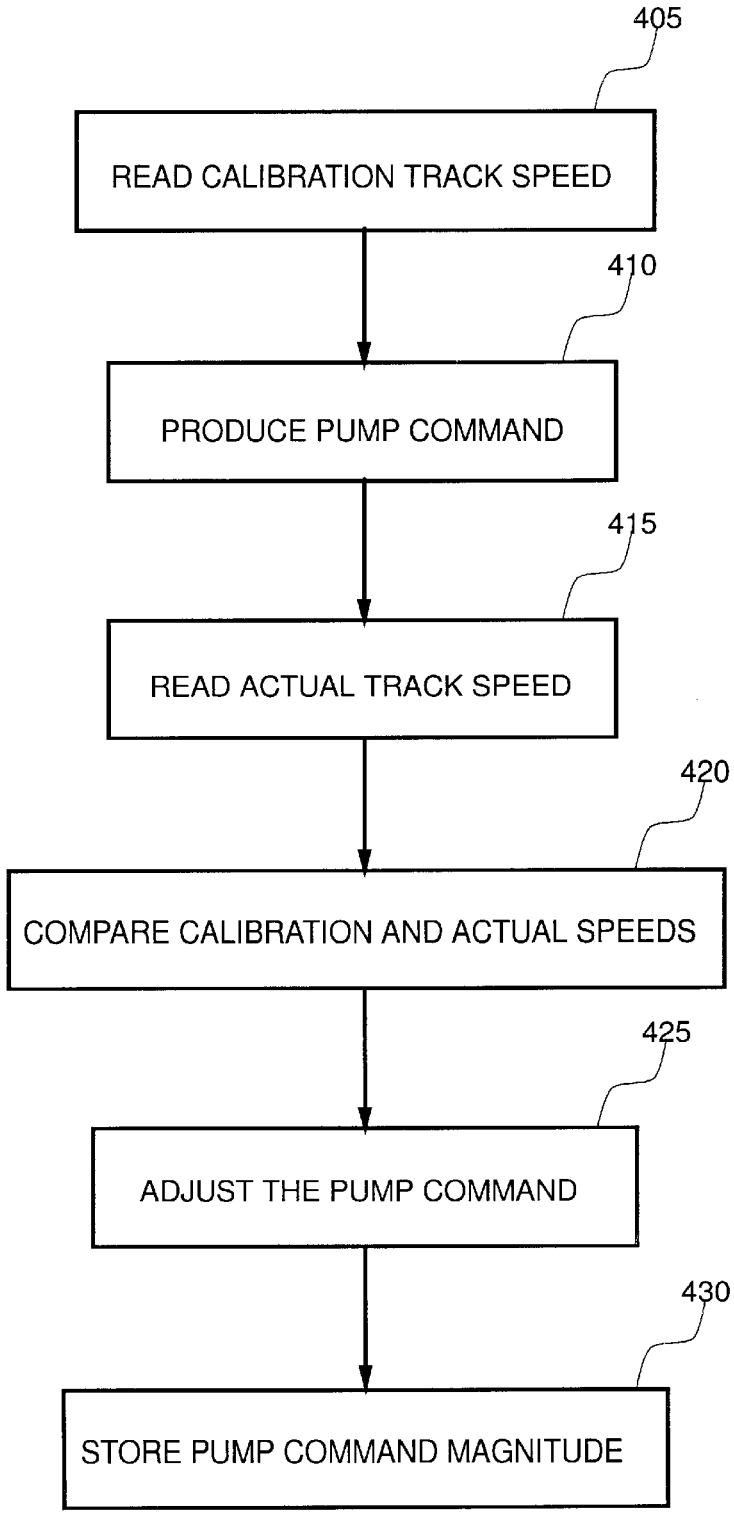
FIG. 4 illustrates a high level block diagram of a pump calibration routine.

Referring now to FIG. 4, a high level block diagram of a pump calibration routine 400 is shown. The pump calibration routine 400 is used to calibrate the pump command signal to a calibration track speed. The pump calibration routine 400 may be required in the event that the hydraulic components are not "matched", which could result in undesirable speed transients while the machine accelerates from a zero speed to a desired speed. The flow diagram represents the calibration for the right pump 215, for example; however, the calibration for the left pump 210 is identical.

First, a calibration track speed is read from system memory (block 405), and a pump command signal having a magnitude associated with the calibration track speed is delivered to the right pump solenoid 235 (block 410). The right track speed signal which is indicative of the actual track speed is received (block 415), and compared to the calibration track speed (block 420). If the actual and calibration track speeds are not equal, then the magnitude of the pump command signal is adjusted accordingly, e.g., either positively or negatively. Once the actual and calibration track speed are equal, then the current magnitude of the pump command signal is stored for the calibration speed. Accordingly, the calibration routine is performed for each pump independently so that the associated pump command signal will provide for an accurate track speed. Note that, the calibration routine can be controlled to simultaneously calibrate each pump. Once the pumps have been calibrated, the values are stored and utilized until the hydraulic components are repaired or replaced.

Thus, while the present invention has been particularly shown and described with reference to the preferred embodiment above, it will be understood by those skilled in the art that various additional embodiments may be contemplated without departing from the spirit and scope of the present invention.

INDUSTRIAL APPLICABILITY

As described, the present invention is particularly suited to control the propulsion (including steering) of an asphalt paver. In order to be more operator friendly than typical asphalt pavers, the control apparatus associated with the present invention utilizes a steering wheel and a brake pedal, as commonly found in an automobile. Thus, the control apparatus is easier to use than traditional pavers, which use a plurality of levers or pedals that to control the track speed and steering of the machine.

Additional advantages include: the track speed calculation routine, which provides for the actual turn radius of the machine to be independent to machine speed to simulate the steering "feel" of an automobile; the track adjusting routine, which provides for the machine to track straight; the underspeed routine, which limits the pump displacement to provide for a minimum allowable engine horsepower; and the calibration routine, which provides for automatic calibration of the pumps to minimize speed transient problems that occur while the machine is accelerating from a zero speed to the desired speed.

Other aspects, objects and advantages of the present invention can be obtained from a study of the drawings, the disclosure and the appended claims.

We claim:

1. An apparatus for controlling the propulsion of a machine having a hydrostatic system that drives a plurality of ground engaging traction devices, comprising:

means for producing a desired travel speed signal indicative of a desired speed of machine travel;

means for producing a steering angle signal indicative of a desired steering angle of the machine travel;

means for receiving the desired travel speed and steering angle signals, determining a desired rotational speed of the ground engaging traction devices to steer the machine at the desired steering angle, and producing command signals indicative of the desired rotational speeds; and means for receiving the command signals and responsively controlling the speed of the ground engaging traction devices to the desired speed to cause the machine to steer at a desired turning radius that is independent to the actual speed of travel.

2. An apparatus, as set forth in claim 1, including means for determining the desired turning radius of the machine, the means including a plurality of software maps, each map being comprised of several programmable curves corresponding to varying speed ranges, wherein each curve represents the desired turning radius as a function of the desired strength angle.

3. An apparatus, as set forth in claim 1, wherein the hydrostatic drive system includes:

a plurality of hydraulic motors for driving a respective ground engaging traction device;

a plurality of variable displacement pumps for delivering pressurized fluid to the hydraulic motors in response to receiving command signals; and an internal combustion engine for driving the variable displacement pumps.

4. An apparatus, as set forth in claim 3, including:

a plurality of spring applied brakes to stop the ground engaging traction devices; and a brake pedal to conduit the travel speed of the machine, wherein the amount of depression of the brake pedal is proportional to the attenuation of the speed of travel.

5. An apparatus, as set forth in claim 4, including means for controlling the pump displacement to slow the machine in response to the depression of the brake pedal and controlling the application of brakes to hold the machine in place in response to the machine being stopped.

6. An apparatus, as set forth in claim 3, including means for controlling the displacement of each pump to limit the total horsepower drawn by the pumps to less than the available engine horsepower.

7. An apparatus, as set forth in claim 3, including means for automatically calibrating the magnitude of the command signals to correspond to a calibration track speed.

8. An apparatus, as set forth in claim 3, wherein the ground engaging traction devices include a pair of endless belts.

9. A method of controlling the propulsion of a machine having a plurality of ground engaging traction devices, comprising the steps of:

producing a desired travel speed signal indicative of a desired speed of machine travel;

producing a steering angle signal indicative of a desired steering angle of the machine travel;

receiving the desired travel speed and steering angle signals, determining a desired rotational speed of the ground engaging traction devices to steer the machine at the desired steering angle, and producing command signals indicative of the rotation speeds; and receiving the command signals and responsively controlling the speed of the ground engaging devices to the desired speed to cause the machine to steer at a desired turning radius that is independent to the actual speed of travel.

10. A method, as set forth in claim 9, including steps of:

storing a plurality of software maps, each map being comprised of several programmable curves corresponding to varying speed ranges, wherein each curve represents the desired turning radius as a function of the desired steering angle; and selecting a curve and producing a desired turning radius signal in response to the desired steering angle.

11. A method, as set forth in claim 10, including the steps of:

producing a maximum speed signal indicative of a maximum travel speed;

producing a propel signal indicative of a desired percentage of maximum travel speed and direction of travel;

producing a braking signal indicative of a desired attenuation of the machine travel speed; and receiving the maximum, propel, braking and desired turning radius signals, and responsively producing the desired travel speed signal.

12. A method, as set forth in claim 11, wherein the desired rotational speed of the ground engaging traction devices are calculated as follows:

$$V_{outer}=V_{desired}(2-2R/G+2R)$$

$$V_{inner}=V_{outer}\ (R/R+G)$$

where:

$V_{desired}$=the desired machine travel speed;

R=the desired turning radius; and

G=the gage of the machine.

13. A method, as set forth in claim 12, including the step of modifying the desired rotational speeds in response to the calculated inner rotational speed being less than a minimum limit.

14. A method, as set forth in claim 13, including the step of modifying the desired rotational speeds in response to the calculated outer rotational speed being greater than a maximum limit.

15. A method, as set forth in claim 14, including the step of monitoring the speed of the ground engaging traction devices and producing signals indicative of the actual speed of the ground engaging devices.

16. A method, as set forth in claim 15, including the step of modifying the maximum limit in response to the actual rotational speed being less than the desired rotational speed.

17. A method, as set forth in claim 16, including the steps of receiving the desired and actual speed signals, comparing the signals to each other, and adjusting the magnitude of the command signals in response to the comparison.

18. A method, as set forth in claim 17, including the step of adjusting the speed of the ground engaging traction devices to provide for the machine to track straight.

*19. A method for controlling the propulsion of a machine having a plurality of ground engaging traction devices, comprising:*

*determining a desired travel speed of the machine;*

*determining a desired steering angle of the machine;*

*determining a respective desired rotational speeds for the ground engaging traction devices to steer the machine at a predetermined turn radius, the predetermined turn radius being a function of the desired steering angle and independent to the actual travel speed of the machine, and the desired rotational speeds being a function of the desired travel speed and the desired steering angle; and*

*controlling the rotational speeds of the ground engaging traction devices to the desired rotational speeds to cause the machine to steer at the predetermined radius.*

*20. The method of claim 19 wherein determining the rotational speeds for the ground engaging traction devices comprises determining the rotational speeds for the ground engaging traction devices to steer the machine at a predetermined turn radius over a predetermined range of travel speeds.*

*21. The method of claim 19, further comprising determining a speed range of the machine, the desired rotational speeds of the ground engaging traction devices further being a function of the speed range.*

*22. The method of claim 19 wherein the ground engaging traction devices comprise tracks.*

*23. The method of claim 19 wherein the ground engaging traction devices comprise belts.*

*24. A method for controlling the propulsion of a machine having a plurality of ground engaging traction devices, comprising:*

*determining a desired travel speed of the machine;*

*determining a desired steering angle of the machine;*

*determining a difference in the respective desired rotational speeds for the ground engaging traction devices to steer the machine at a predetermined turn radius, the predetermined turn radius being a function of the desired steering angle and independent to the actual travel speed of the machine, and the difference in the desired rotational speeds being a function of the desired travel speed and the desired steering angle; and*

*controlling the rotational speeds of the ground engaging traction devices to have the difference in the desired rotational speeds to cause the machine to steer at the predetermined radius.*

*25. The method of claim 24 wherein determining a difference in the rotational speeds for the ground engaging traction devices comprises determining a difference in the rotational speeds for the ground engaging traction devices to steer the machine at a predetermined turn radius over a predetermined range of travel speeds.*

*26. The method of claim 24, further comprising determining a speed range of the machine, the difference in the desired rotational speeds of the ground engaging traction devices further being a function of the speed range.*

*27. The method of claim 24 wherein the ground engaging traction devices comprise tracks.*

*28. The method of claim 24 wherein the ground engaging traction devices comprise belts.*

*29. A method for controlling the propulsion of a machine having a plurality of ground engaging traction devices, comprising:*

*determining a desired travel speed of the machine;*

*determining a desired steering angle of the machine;*

*determining respective desired rotational speeds for the ground engaging traction devices to steer the machine at a predetermined turn radius, the predetermined turn radius being one of:*

*a function of the desired steering angle and independent to the actual travel speed of the machine when the machine is traveling between a first and second predetermined travel speeds, and*

*a function of the desired steering angle and the actual travel speed of the machine when the machine is traveling between a third and fourth predetermined travel speeds,*

*and the desired rotational speeds being a function of the desired travel speed and the desired steering angle; and*

*controlling the rotational speeds of the ground engaging traction devices to the desired rotational speeds to cause the machine to steer at the predetermined radius.*

*30. The method of claim 29 wherein the ground engaging traction devices comprise tracks.*

*31. The method of claim 29 wherein the ground engaging traction devices comprise belts.*

*32. A method for controlling the propulsion of a machine having an operating speed range and a plurality of ground engaging traction devices, comprising:*

*determining a desired travel speed of the machine;*

*determining a desired steering angle of the machine;*

*determining respective desired rotational speeds for the ground engaging traction devices to steer the machine at a predetermined turn radius, the predetermined turn radius being a function of the desired steering angle and independent to the actual travel speed of the machine for at least a portion of the operating speed range of the machine, and the desired rotational speeds being a function of the desired travel speed and the desired steering angle; and*

*controlling the rotational speeds of the ground engaging traction devices to the desired rotational speeds to cause the machine to steer at the predetermined radius.*

* * * * *

UNITED STATES PATENT AND TRADEMARK OFFICE

CERTIFICATE OF CORRECTION

PATENT NO. : RE 38,632 E
DATED : October 19, 2004
INVENTOR(S) : Alan L. Ferguson et al.

It is certified that error appears in the above-identified patent and that said Letters Patent is hereby corrected as shown below:

Column 7,
Line 60, delete “conduit” (first occurrence) and insert -- control --

Column 8,
Line 11, delete “of” (first occurrence) and insert -- for --

Signed and Sealed this

Twenty-fifth Day of January, 2005

JON W. DUDAS
*Director of the United States Patent and Trademark Office*